United States Patent
Flens

(10) Patent No.: US 10,361,776 B2
(45) Date of Patent: Jul. 23, 2019

(54) SPARING CONFIGURATIONS AND PROTOCOLS FOR PARALLEL FIBER OPTICS

(71) Applicant: FINISAR CORPORATION, Sunnyvale, CA (US)

(72) Inventor: Frank J. Flens, Campbell, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 15/900,551

(22) Filed: Feb. 20, 2018

(65) Prior Publication Data

US 2018/0219629 A1 Aug. 2, 2018

Related U.S. Application Data

(63) Continuation of application No. 15/074,798, filed on Mar. 18, 2016, now Pat. No. 9,900,085.

(60) Provisional application No. 62/134,750, filed on Mar. 18, 2015.

(51) Int. Cl.
*H04B 10/40* (2013.01)
*H04J 14/02* (2006.01)
*H04B 10/032* (2013.01)

(52) U.S. Cl.
CPC .......... *H04B 10/032* (2013.01); *H04B 10/40* (2013.01); *H04J 14/0297* (2013.01)

(58) Field of Classification Search
CPC .................. H04B 10/032; H04J 14/0297
See application file for complete search history.

(56) References Cited

U.S. PATENT DOCUMENTS

| | | | | |
|---|---|---|---|---|
| 2004/0161232 | A1* | 8/2004 | Kerfoot, III | H04J 14/029 398/5 |
| 2007/0058973 | A1* | 3/2007 | Tanaka | H04B 10/032 398/1 |
| 2009/0060522 | A1* | 3/2009 | Aronson | H04B 10/032 398/141 |
| 2013/0039643 | A1* | 2/2013 | Tokura | H04B 10/032 398/7 |

* cited by examiner

*Primary Examiner* — Casey L Kretzer
(74) *Attorney, Agent, or Firm* — Maschoff Brennan

(57) ABSTRACT

A transceiver can include a transmitter and a receiver. The transmitter can include: a primary laser emitter; a primary monitor photodiode optically coupled with the laser emitter; a spare laser emitter; and a transmitter integrated circuit having a primary channel operably coupled with the primary laser emitter; a spare channel operably coupled with the spare laser emitter; a switch on the primary channel; and a secondary channel operably coupled with the switch and the spare channel. The receiver can include: a primary detector photodiode; a spare detector photodiode; and a receiver integrated circuit a primary receiver channel operably coupled with the at least one primary detector photodiode; a spare receiver channel operably coupled with the spare detector photodiode; a receiver switch on the spare receiver channel; and a secondary receiver channel operably coupled with the receiver switch and the primary receiver channel.

18 Claims, 9 Drawing Sheets

SPARING CONFIGURATIONS AND PROTOCOLS FOR PARALLEL FIBER OPTICS

CROSS-REFERENCE

This patent application is a Continuation of U.S. patent application Ser. No. 15/074,798 filed Mar. 18, 2016, which claims priority to U.S. Provisional Application No. 62/134,750 filed Mar. 18, 2015, both of which are incorporated herein by specific reference in their entirety.

BACKGROUND

The present disclosure relates to high-speed fiber optic networks that use light signals to transmit data over a network. Fiber optic networks have various advantages over other types of networks such as copper wire based networks. Many existing copper wire networks operate at near maximum possible data transmission rates and at near maximum possible distances for copper wire technology. Fiber optic networks are able to reliably transmit data at higher rates over further distances than is possible with copper wire networks.

The claimed subject matter is not limited to configurations that solve any disadvantages or that operate only in environments such as those described above. This background is only provided to illustrate examples of where the present disclosure may be utilized.

SUMMARY

In one embodiment, a transmitter can include: at least one primary laser emitter; at least one primary monitor photodiode optically coupled with the at least one laser emitter; at least one spare laser emitter; and a transmitter integrated circuit operably coupled with the at least one primary laser emitter and at least one spare laser emitter. In one aspect, the transmitter integrated circuit can include: at least one primary channel operably coupled with the at least one primary laser emitter; at least one spare channel operably coupled with the at least one spare laser emitter; at least one switch on the at least one primary channel; and at least one secondary channel operably coupled with the at least one switch and the at least one spare channel. In one aspect, the transmitter can include at least one spare monitor photodiode optically coupled with the at least one spare laser emitter. In one aspect, the at least one primary monitor photodiode is operably coupled with the transmitter integrated circuit such that failure of the at least one primary laser emitter causes the at least one switch to route a signal from the at least one primary channel to the at least one secondary channel to the at least one spare channel to the at least one spare laser emitter. In one aspect, the at least one primary monitor photodiode is operably coupled with the at least one switch. In one aspect, the at least one primary monitor photodiode is operably coupled to a transmitter host that is operably coupled with the transmitter integrated circuit. In one aspect, the transmitter host includes a controller (e.g., computer) that is operably coupled with the switch and configured to control the switch.

In one embodiment, a transmitter of any embodiment described herein can include N primary channels, N switches, N secondary channels, N primary laser emitters, and N primary monitor photodiodes, and comprising M spare laser emitters, wherein N and M are independently integers. In one aspect, N is at least 3 and M is 1.

In one embodiment, a transmitter of any embodiment described herein can include at least one secondary laser emitter adjacent with each of the at least one primary laser emitters such that a first primary laser emitter and first secondary laser emitter pair are directed out a common optical fiber. In one aspect, when the first primary laser emitter fails, a first primary channel switches from being operably coupled with the first primary laser emitter to being operably coupled with the first secondary laser emitter.

In one embodiment, a transmitter of any embodiment described herein can include a flag switch that sends a signal to a host having the transmitter when the first primary laser emitter fails and the first secondary laser emitter is activated.

In one embodiment, a receiver can include: at least one primary detector photodiode; at least one spare detector photodiode; and a receiver integrated circuit operably coupled with the at least one primary detector photodiode and at least one spare detector photodiode. In one aspect, the receiver integrated circuit can include: at least one primary receiver channel operably coupled with the at least one primary detector photodiode; at least one spare receiver channel operably coupled with the at least one spare detector photodiode; at least one receiver switch on the at least one spare receiver channel; and at least one secondary receiver channel operably coupled with the at least one receiver switch and the at least one primary receiver channel. In one aspect, the receiver integrated circuit is configured with a signal detect assert for the at least one primary receiver channel when the at least one primary detector photodiode receives incoming laser light and configured with a signal detect de-assert for the at least one primary receiver channel when the at least one primary detector photodiode does not receive incoming laser light. In one aspect, the signal detect de-assert causes the at least one receiver switch to change output to the at least one primary receiver channel having the signal detect de-assert.

In one embodiment, the receive includes at least one primary detector photodiode being operably coupled with the receiver integrated circuit such that absence of incoming laser light causes the at least one receiver switch to route a signal from the at least one spare receiver channel, to the at least one secondary receiver channel, to the at least one primary channel that is operably coupled to the at least one primary detector photodiode having the absence of incoming laser light. In one aspect, the at least one primary detector photodiode is operably coupled with the at least one receiver switch. In one aspect, the at least one primary detector photodiode is operably coupled to a receiver host that is operably coupled with the receiver integrated circuit. In one aspect, the receiver host includes a controller (e.g., computer) that is operably coupled with the receiver switch and configured to control the receiver switch.

In one aspect, a receiver of any embodiment described herein can include N primary receiver channels, N secondary receiver channels, and N primary detector photodiodes, and comprising M spare detector photodiodes, wherein N and M are independently integers. In one aspect, N is at least 3 and M is 1.

In one embodiment, a transceiver can include a transmitter and a receiver. In one aspect, the transmitter can include: at least one primary laser emitter; at least one primary monitor photodiode optically coupled with the at least one laser emitter; at least one spare laser emitter; and a transmitter integrated circuit operably coupled with the at least one primary laser emitter and at least one spare laser emitter. In one aspect, the transmitter integrated circuit can include: at least one primary channel operably coupled with the at least one primary laser emitter; at least one spare channel operably coupled with the at least one spare laser emitter; at least one switch on the at least one primary channel; and at least one secondary channel operably coupled with the at least one switch and the at least one spare channel. In one aspect, the receiver can include: at least one primary detector photodiode; at least one spare detector photodiode; and a receiver integrated circuit operably coupled with the at least one primary detector photodiode and at least one spare detector photodiode. In one aspect, the receiver integrated circuit can include: at least one primary receiver channel operably coupled with the at least one primary detector photodiode; at least one spare receiver channel operably coupled with the at least one spare detector photodiode; at least one receiver switch on the at least one spare receiver channel; and at least one secondary receiver channel operably coupled with the at least one receiver switch and the at least one primary receiver channel.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1A:
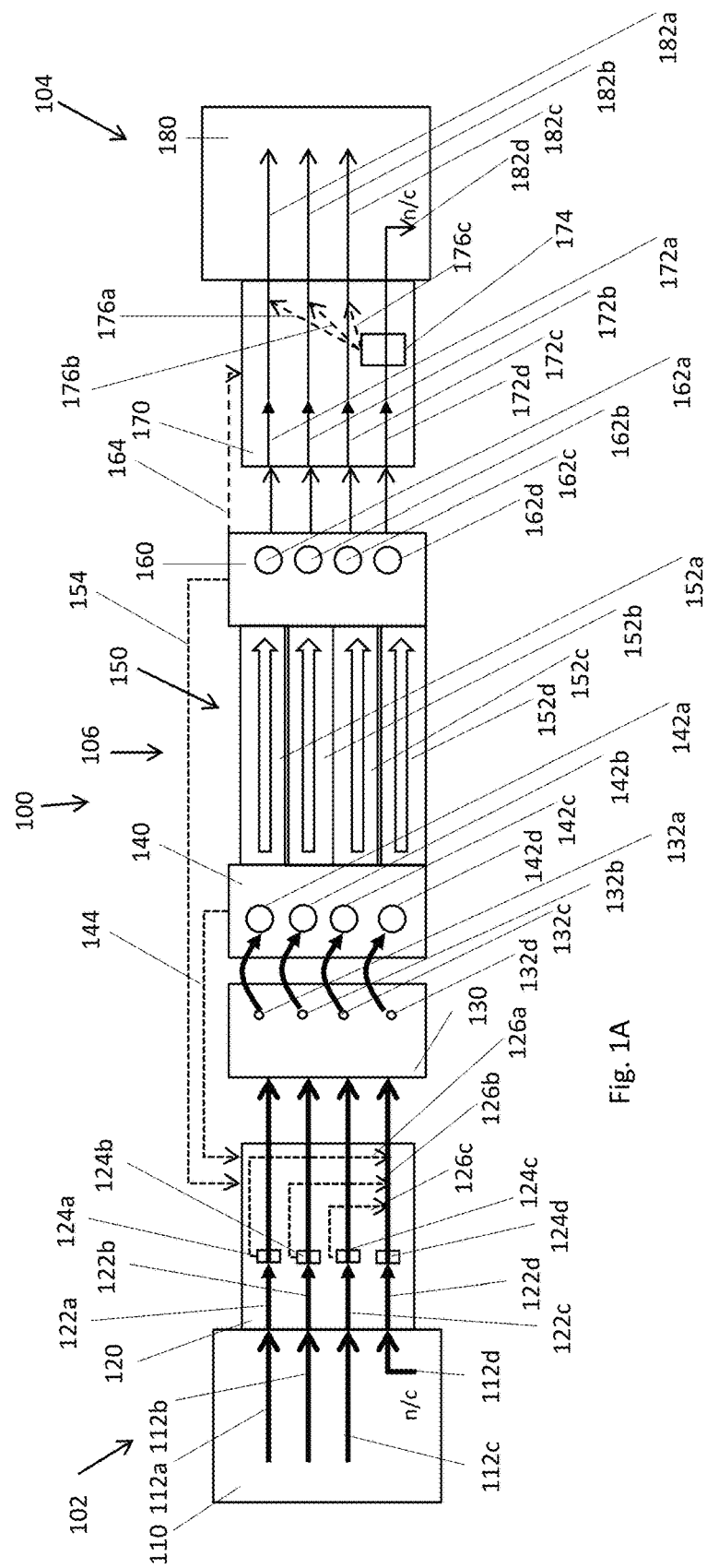
FIG. 1A illustrates an embodiment of a network.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present invention provides sparing for devices, systems, networks, and methods of data communication that employs N+1 communication lanes with the N being the number of ordinary communication lanes and the +1 being a redundant or backup lane. That is, there can be any number of communication lanes in the invention that provide for data communications so long as one of the communication lanes is reserved as a backup, where the backup provides a spare data lane. The devices can be transmitters, transceivers, receivers, systems, and networks that utilize sparing protocols. The sparing methods can include data or signal routing protocols that don't use the backup lane when the ordinary communication lanes are functional, and then stitches one lane to the backup lane when the one lane fails. Often, the failure is at the laser emitter; however, the failure may be in the optical link between a laser emitter and detector photodiode.

In one embodiment, the invention can be utilized in high density parallel data communication systems where there is a higher chance that a laser emitter (e.g., VCSEL) can fail and cause a loss of data link. Failure of a data link can cause general failure in mission critical applications. As such, sparing can be implemented at the upper level in the data communication hierarchy such as through software; however, this is not optimal and may take time before sparing can be implemented which results in data loss. Thus, an automatic system that can implement sparing at the physical level or in the hardware can be advantageous so that the sparing and signal lane switching occurs automatically upon failure of a component (e.g., laser emitter). The invention can provide sparing architecture that uses hardware with a dedicated redundant or backup data lane. This provides the N+1 sparing architecture, where N data lanes are operational with the +1 being a spare data lane that is used as a backup. In one example, the system can include four data lanes where only three out of four of the data lanes are used for data traffic operation and the fourth lane is reserved as the spare or backup.

In one embodiment, when the laser emitter (e.g., VCSEL) of a data lane (e.g., data traffic lane) fails, the monitor of that lane detects that the lane fails and sends a signal back to the laser driver of the failed data lane. In turn, the laser driver then disconnects the signal path from the failed data lane and connects the signal path to the spare lane. The spare lane then transmits optical data from its laser emitter that is still operating properly. The monitor can still monitor the laser emitter of the spare lane. Also, a spare detector photodiode can be linked to the spare laser emitter and receive the data therefrom. The receiver then routes the signal to the proper location of the failed data lane.

In one embodiment, the detector photodiode at the opposite end of the link of the failed lane (e.g., failed laser emitter) detects no light, and the receiver then simultaneously begins to detect light on the spare lane from the spare laser emitter with the spare detector photodiode. The receiver can include a receiver integrated circuit that is programmed to switch the data path from the spare lane back to the original output lane. This allows the data of the failed lane to be transmitted on the spare lane and then be routed back to the receiver side of the failed lane in a seamless transition without significant data loss.

In one embodiment, the present invention provides for sparing hardware so that the sparing hardware automatically detects the failed laser emitter and automatically routes the data to the laser emitter of the spare lane. Automatic sparing with sparing hardware in the transceiver can be useful when failover is time sensitive.

In one embodiment, the present invention can provide for sparing software that controls the transmitter, receiver, and/or transceivers when simplicity or more flexibility is desirable. That is, software can be used to process the detection of a lane failure, implement the lane switching to the spare lane on the transmitter side, and implement the receiver side lane switching back to the lane having the failure so that the data on the failed lane is routed to the corresponding receiver lane.

In one embodiment, once a data lane fails, the host system can be notified that the lane has failed and needs to be repaired at the next service interval. However, full system performance is maintained by the spare lane operating in place of the failed data lane. The various components, such as the monitor photodiode, detector photodiode, transmitter integrated circuit, transmitter host, controller, or other component can provide the host system with a notification that a data lane has failed. Also, the specific lane that has failed can be provided to the host system.

In one embodiment, a transmitter can be prepared to include N data communication lanes and a spare lane to provide N+1 data communication lanes. The transmitter is configured so that the spare lane is not involved in ordinary data communication, and is ready and waiting to be used when one of the N data communication lanes fails. As such, the spare lane is an extra lane in the transmitter. The system also include a receiver that has a corresponding spare receiver lane and is configured to route data from the spare receiver lane to the failed lane in a seamless transition.

In one embodiment, a network includes a complete spare lane, from the transmitter integrated circuit to the laser emitter, to the monitor photodiode, to the optical fibers, to the detector photodiode, to the receiver integrated circuit, and optionally from the transmitter host and/or to the receiver host.

In one embodiment, the network can include N+M data communication lanes, where N is the number of normal operational data communication lanes and M is the number of spare lanes. M can be less than, equal to, or greater than N. As such, any level or percentage redundancy can be provided by the M spare lanes. M can be any integer, such as 1, 2, 3, 4, 5, 6, 7, 8, 9, 10, 11, 12, 13, 14, 15, 16, 17, 18, 19, 20, 21, 22, 23, or higher as needed, desired, or developed.

FIG. 1A illustrates a network 100 in accordance with the present invention. The network includes a transmitter 102 and a receiver 104 that are operably coupled together via a data link 106 so that the transmitter 102 can transmit data over the data link 106 to the receiver 104. The transmitter 102 is shown to include a transmitter host 110 operably coupled to a transmitter integrated circuit ("TIC") 120, which is operably coupled to a laser array 130 that is operably coupled to a monitor array 140. The transmitter 102 is configured so that data is provided by the transmitter host 110 to the TIC 120, and from the TIC 120 to the laser array 130 that emits laser light that is detected by the monitor array 140. The monitor array 140 enables diagnostics to determine whether or not the laser array 130 is operating within operational parameters. The data link 106 includes a plurality of optical fibers 152a-d that connect (e.g., communicatively couple) the transmitter 102 to the receiver 104. The receiver 104 includes a detector array 160 that is operably coupled to a receiver integrated circuit ("RIC") 170, which is operably coupled to a receiver host 180. The network 100 allows the transmitter host 110 to provide data to the receiver host 180. The transmitter host 110 can be included in a transceiver with a corresponding receiver, and the receiver host 180 can be included in a transceiver with a corresponding receiver.

The transmitter host 110 is shown to have a first channel 112a, a second channel 112b, a third channel 112c, and a fourth channel 112d. The fourth channel 112d is shown to be a no connect, which is optional, as data may or may not be transmitted over the fourth channel 112d during normal operation. However, during a laser failure operating condition, the fourth channel 112d may be configured to provide data, which will be described in more detail herein. As such, under normal operation, the fourth channel 112d may be devoid of data.

The transmitter host 110 is communicatively coupled with the TIC 120, such that the first channel 112a provides data to a first primary channel 122a, the second channel 112b provides data to a second primary channel 122b, the third channel 112c provides data to a third primary channel 122c, and the fourth channel 112d is connected to a fourth primary channel 122d and may provide data in some configurations. The first primary channel 122a has a first switch 124a that is operably coupled to a first secondary channel 126a, where the first secondary channel 126a is also connected to the fourth primary channel 122d. The second primary channel 122b has a second switch 124b that is operably coupled to a second secondary channel 126b, where the second secondary channel 126b is also connected to the fourth primary channel 122d. The third primary channel 122c has a third switch 124c that is operably coupled to a third secondary channel 126c, where the third secondary channel 126c is also connected to the fourth primary channel 122d. The fourth primary channel 122d may optionally have a fourth switch 124d that can switch on or off to control data from the fourth channel 112d.

The TIC 120 is operably coupled with the laser array 130 so that electronic data from the TIC 120 is emitted as optical data by the laser array 130. Accordingly, the first primary channel 122a is operably coupled with a first laser emitter 132a, the second primary channel 122b is operably coupled with a second laser emitter 132b, the third primary channel 122c is operably coupled with a third laser emitter 132c, and the fourth primary channel 122d is operably coupled with a fourth laser emitter 132d. As schematically shown, the laser array 130 is operably coupled with the monitor array 140. Accordingly, the first laser emitter 132a is optically coupled with a first monitor photodiode 142a, the second laser emitter 132b is optically coupled with a second monitor photodiode 142b, the third laser emitter 132c is optically coupled with a third monitor photodiode 142c, and the fourth laser emitter 132d is optically coupled with a fourth monitor photodiode 142d.

The monitor array 140 can be used to determine whether each of the laser emitters is functioning properly and has sufficient optical power. In one operating environment, the fourth laser emitter 132d does not provide data modulated laser light when the other laser emitters (e.g., 132a-c) are functioning properly. Accordingly, the fourth laser emitter 132d is on a redundant channel (e.g., the fourth channel 112d, the fourth primary channel 122d, etc.), and serves as backup in case one of the other laser emitters (e.g., 132a-c) fails. As such, the monitor array 140 is communicatively coupled with the TIC 120 through a monitor feedback loop 144 so that data regarding the functionality of each laser emitter can be provided to the TIC 120. When each of the laser emitters of the laser array 130 is functioning properly, laser is emitted through the data link 106 to the detector array 160. However, when one of the laser emitters is not functioning properly, the monitor array 140 communicates through the monitor feedback loop 144 to the TIC 120 and identifies which laser emitter is not functioning properly. While a common monitor feedback loop 144 is shown for the entire monitor array 140, each monitor photodiode can have its own feedback loop to the TIC 120. While the fourth laser emitter 132d may not have data modulated on the emitted light, it may emit light so that it can be determined whether or not it is functioning properly and can be used as a backup. Accordingly, the TIC 120 receives data to identify which laser emitter is not functioning properly.

When one of the laser emitters 132a-d is not functioning properly, the TIC 120 receives diagnostic data through the monitor feedback loop 144 from the monitor array 140 that can identify which laser emitter is not functioning properly. The TIC 120 can process the diagnostic data in order to determine which primary channel is operably connected to the dysfunctional laser emitter, and thereby determine which primary channel needs to be shutoff and which secondary channel needs to be turned on. Accordingly, the TIC 120 can flip one of the switches 124a-c to turn off the corresponding primary channel (e.g., 122a-122c) and turn on the secondary channel (e.g., 126a-126c), and correspondingly flip the fourth switch 124d to turn off data from the fourth channel 112d, if present. This allows data from the operational secondary channel (e.g., 126a-126c) to be provided to the fourth primary channel 122d and to the fourth laser emitter 132d, and thereby the fourth laser emitter 132d provides the data from the channel with the dysfunctional laser emitter. When light is emitted from the fourth laser emitter 132d, the fourth monitor photodiode 142d receives the light and the monitor array 140 can provide data regarding whether or not the fourth laser emitter 132d is functioning properly, as discussed herein.

The laser array 130 is operably coupled with the data link 106, as schematically shown, which can be to an optical fiber array 150. Accordingly, the laser array 130 is operably coupled to the detector array 160 through the optical fiber array 150. The optical fiber array 150 can have: a first optical fiber 152a optically coupled at one end to the first laser emitter 132a and at the other end to a first detector photodiode 162a; a second optical fiber 152b optically coupled at one end to the second laser emitter 132b and at the other end to a second detector photodiode 162b; a third optical fiber 152c optically coupled at one end to the third laser emitter 132c and at the other end to a third detector photodiode 162c; and a fourth optical fiber 152d optically coupled at one end to the fourth laser emitter 132d and at the other end to a fourth detector photodiode 162d. The arrows show the direction of the data communication. Optionally, the detector array 160 can be operably coupled with the transmitter 102 (e.g., at the TIC 120 as illustrated or to the transmitter host 110, or elsewhere) through a detector feedback loop 154. The detector feedback loop 154 can provide detector feedback data that provides information about the quality of the laser light received into the detector array 160. The detector feedback data can be related to a dysfunctional laser emitter or a defective data link 106. Thus, data can be obtained to determine whether the backup laser emitter (e.g., 132d) needs to be utilized and/or whether the data link 106 needs to be repaired.

The detector array 160 is operably coupled with the RIC 170. As such, the first detector photodiode 162a is electrically coupled with a first receiver channel 172a, the second detector photodiode 162b is electrically coupled with a second receiver channel 172b, the third detector photodiode 162c is electrically coupled with a third receiver channel 172c, and the fourth detector photodiode 162d is electrically coupled with a fourth receiver channel 172d. The fourth receiver channel 172d includes a receiver switch 174 that is operably coupled to a first secondary receiver channel 176a, a second secondary receiver channel 176b, and a third secondary receiver channel 176c. This allows data received by the fourth detector photodiode 162d to be routed from the fourth receiver channel 172d to the proper receiver channel that corresponds with the primary channel in the TIC 120 that is routed through the fourth primary channel 122d, the fourth laser emitter 132d, and the fourth optical fiber 152d to the fourth detector photodiode 162d.

Additionally, the detector array 160 can by operably coupled to the RIC 170 through a feedforward channel 164. As such, the detector array 160 can obtain data regarding which of the detector photodiodes 162a-d is not receiving laser light. This can allow the RIC 170 to activate the receiver switch 174 to the secondary receiver channel (e.g., 176a-c) that is operably coupled with the receiver channel that normally receives a signal from the inactive detector photodiode. Then, the signal from the fourth detector photodiode 162d can be passed through the fourth receiver channel 172d, through the receiver switch 174, and through the appropriate secondary receiver channel to the appropriate receiver channel. For example, if the second detector photodiode 162b is not receiving laser light, data is passed through the feedforward channel 164 to the RIC 170 so that the receiver switch 174 routes the signal from the fourth receiver channel 172d to the second receiver channel 172b.

The RIC 170 is operably coupled with the receiver host 180. As such, the first receiver channel 172a is electrically coupled with a first receiver host channel 182a, the second receiver channel 172b is electrically coupled with a second receiver host channel 182b, the third receiver channel 172c is electrically coupled with a third receiver host channel 182c, and the fourth receiver channel 172d is electrically coupled with a fourth receiver host channel 182d. The fourth receiver host channel 182d may receive data or be a no connect.

Figure 1B:
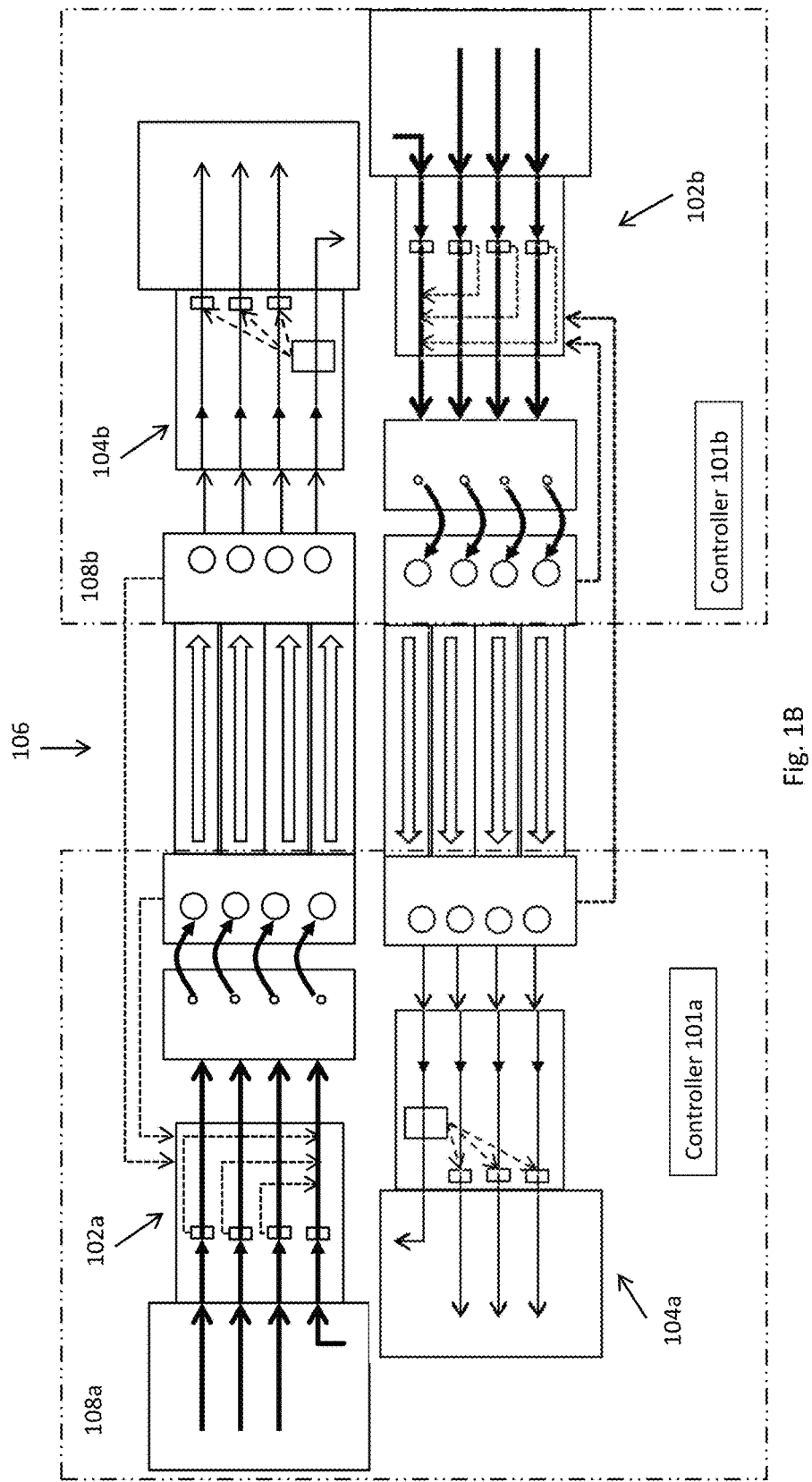
FIG. 1B illustrates an embodiment of a network having a first transceiver and a second transceiver.

FIG. 1B shows a network having a first transceiver 108a with a first transmitter 102a and a first receiver 104a, and having a second transceiver 108b with a second transmitter 102b and a second receiver 104b. The first transmitter 102a is communicatively coupled with the second receiver 104b through the data link 106, and the second transmitter 102b is communicatively coupled with the first receiver 104a through the data link 106. Additionally, the first transceiver 108a is shown to include a first controller 101a, and the second transceiver 108b is shown to include a second controller 101b. The controllers 101a-b can control any component of the transceivers 108a-b.

Figure 2:
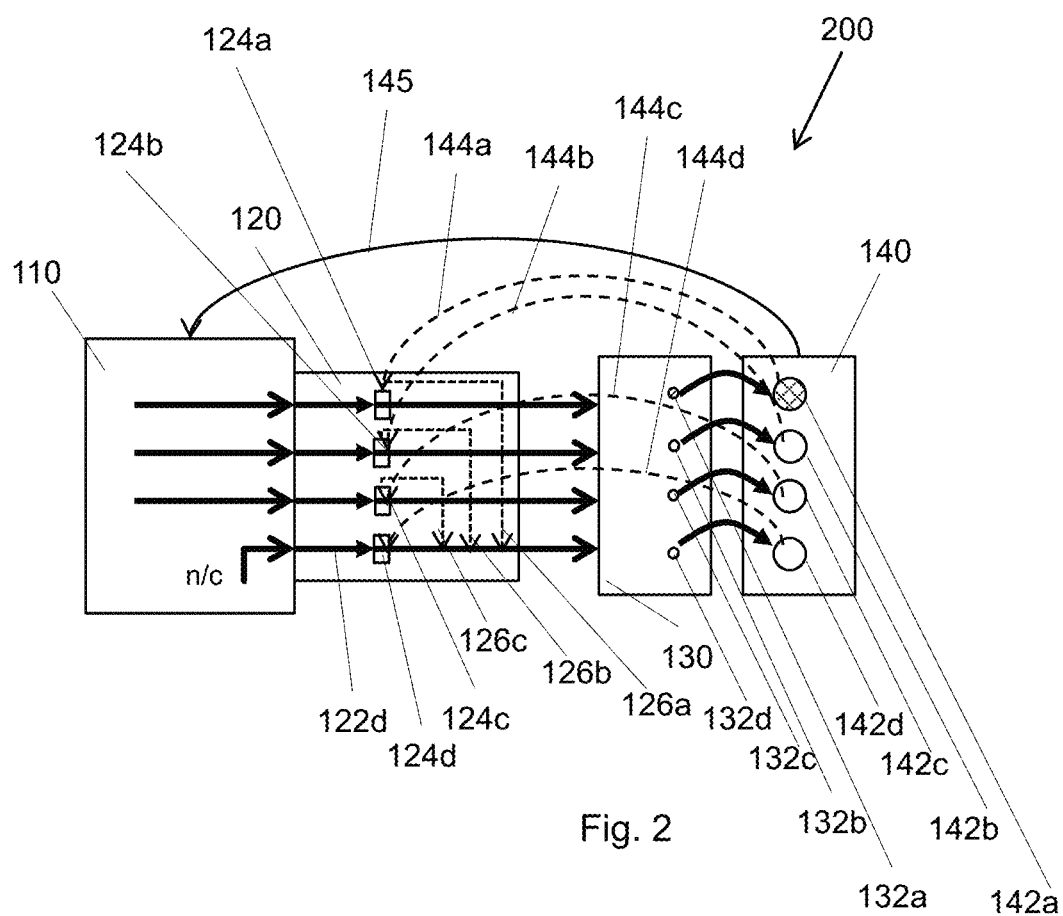
FIG. 2 illustrates an embodiment of a transmitter.

FIG. 2 illustrates a transmitter 200 where each of the monitor photodiodes 142a-d of the monitor array 140 is operably coupled with the switches 124a-d of the TIC 120. The coupling can be electronic and/or optical. As such, data regarding the functionality of each of the laser emitters 132a-d can be obtained by the monitor photodiodes 142a-d and provided to the TIC 120, or provided directly to the switches 124a-d via monitor feedback loops 144a-d. As such, the first monitor feedback loop 144a connects the first monitor photodiode 142a to the first switch 124a, the second monitor feedback loop 144b connects the second monitor photodiode 142b to the second switch 124b, the third monitor feedback loop 144c connects the third monitor photodiode 142c to the third switch 124c, and the fourth monitor feedback loop 144d connects the fourth monitor photodiode 142d to the fourth switch 124d. When the laser emitters 132a-d are functioning properly, the monitor photodiodes 142a-d provide a first signal to the switches 124a-d which allows the laser emitters 132a-d to keep receiving the appropriate signals. When one of the laser emitters 132a-c is not functioning properly, one of the monitor photodiodes 142a-c provides a second signal to one of the switches 124a-c. The second signal causes the switch to switch to the corresponding secondary channel so that the data is routed to the fourth primary channel and to the fourth laser emitter 132d. The fourth laser emitter 132d then emits the laser light with the signal that normally would be emitted by the dysfunctional laser emitter. One of the first or second signal may be an electrical signal and the other can be the absence of an electrical signal, which allows for automatic diagnostics. This allows for the monitor photodiode to send an electric signal when it receives proper laser light from the laser emitter, and the electric signal keeps the switch switched to the primary channel. When a monitor photodiode ceases to receive laser light from an emitter that monitor photodiode ceases to send an electric signal to the corresponding switch, and the switch is tripped to route the data through the corresponding secondary channel to the fourth primary channel and fourth laser emitter. As such, the fourth primary channel and fourth laser emitter can provide a backup to the dysfunctional laser emitter. This redundancy can allow for improved operation.

For example, the first laser emitter 132a is dysfunctional or not operating properly. The second and third laser emitters 132b-c are working properly, and thereby are not discussed. The fourth laser emitter 132d is either not operating, on standby, or providing only light without data. The first monitor photodiode 142a does not receive proper light when the first laser emitter 132a is not operating properly, and ceases to provide an electric signal over the first monitor feedback loop 144a to the first switch 124a. When the first switch 124a receives the normal electric signal from the first monitor feedback loop 144a, data continues to flow through the first primary channel 122a. When the first switch 124a no longer receives the normal electric signal from the first monitor feedback loop 144a, the first switch 124a is flipped and the data is now provided to the first secondary channel 126a, and to the fourth primary channel 122d. The fourth primary channel 122d provides the data that is emitted from the fourth laser emitter 132d. As such, the fourth laser emitter 132d replaces the first laser emitter 132a to provide the data from the first primary channel 122a to the fourth detector photodiode 162d. As long as the second and third laser emitters 132b-c operate properly, the system functions as required. Accordingly, the four channel system is configured as a 3+1 system where there are three main channels and a backup channel. This allows the invention to be employed by N+1 systems with N main channels and a single backup channel, where N can be any integer, such as 1, 2, 3, 4, 5, 6, 7, 8, 9, 10, 11, 12, 13, 14, 15, 16, 17, 18, 19, 20, 21, 22, 23, or higher as needed, desired, or developed. However, N being 3 or higher can be preferred.

Additionally, FIG. 2 shows a feedback loop 145 that communicatively couples the monitor array 140 with the transmitter host 110. The feedback loop 145 can be used with or in place of the monitor feedback loop 144 or any of the monitor feedback loops 144a-144d. As such, the feedback loop 145 can provide the data regarding laser emitters directly to the transmitter host 110. Then, the transmitter host 110 can implement the sparing protocol described herein, where a controller (e.g., the controller 101a) may control such a protocol. Control of the protocol can involve utilizing software to instruct the switches to switch.

Figure 3A:
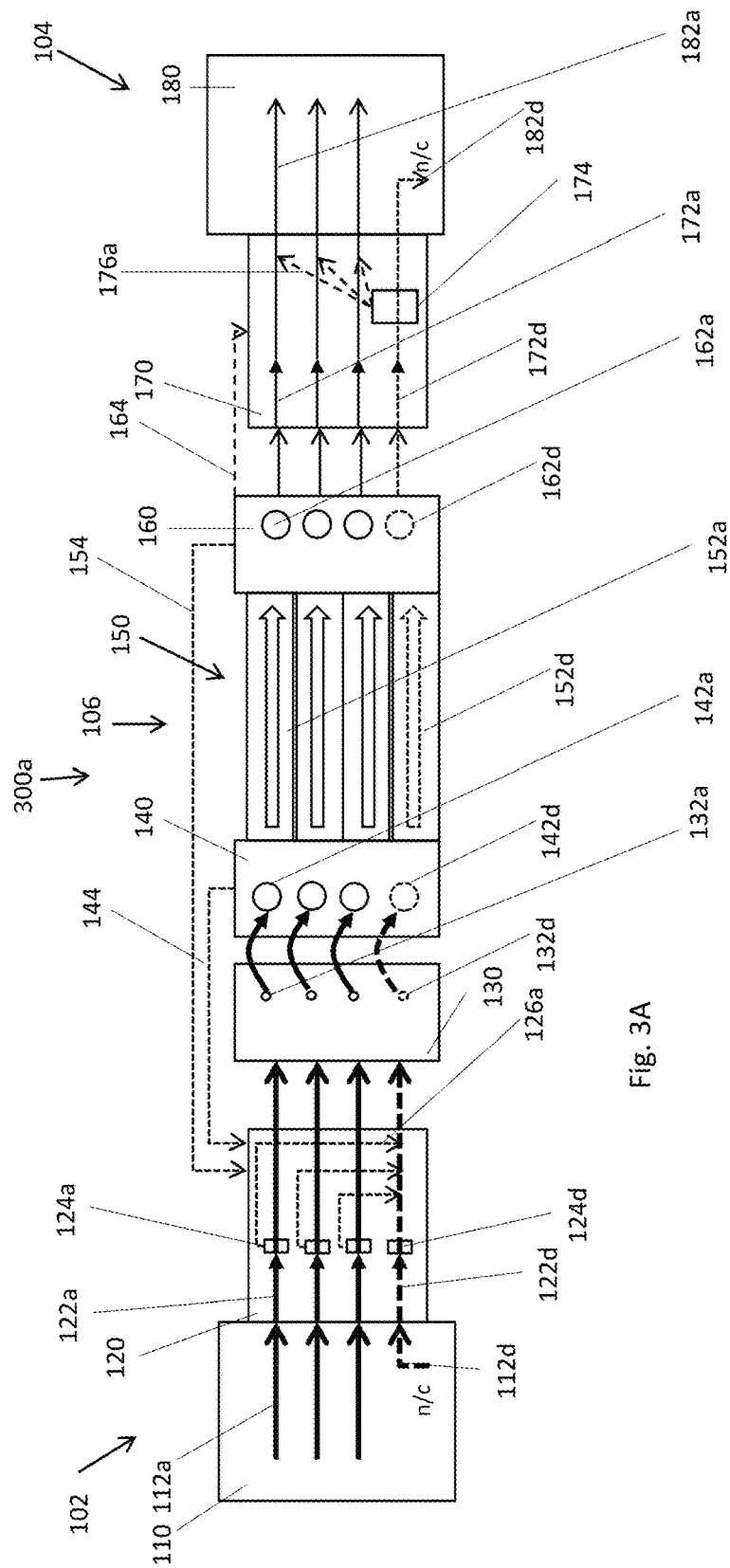
FIG. 3A illustrates an embodiment of a network without a failure.

FIG. 3A illustrates a network 300a where the fourth channel 112d does not provide a data signal or the data signal does not provide important data, and the fourth primary channel 122d does not receive data to transmit over the fourth laser emitter 132d. However, the fourth channel 112d may provide some operational data so that the fourth laser emitter 132d operates so that a determination can be made as to whether or not the fourth laser emitter 132d is functioning properly. Accordingly, the fourth channel 112d and the fourth primary channel 122d may not provide critical data to be transmitted to the receiver 104; however, the fourth laser emitter 132d may receive a signal from the fourth channel 112d and/or the fourth primary channel 122d so that the fourth laser emitter 132d emits some light. Also, the fourth laser emitter 132d may emit some light so that the fourth monitor photodiode 142d receives some light for diagnostics and some light may be passed through the fourth optical fiber 152d to the fourth detector photodiode 162d, and thereby some electrical signal can be passed through the fourth receiver channel 172d and to the fourth receiver host channel 182d. This is shown by the fourth channel 112d, the fourth primary channel 122d, the fourth laser emitter 132d, the fourth monitor photodiode 142d, the fourth optical fiber 152d, the fourth detector photodiode 162d, the fourth receiver channel 172d, and the fourth receiver host channel 182d being in dashed lines. The dashed lines show that the channel and components can function properly if data is provided. Also, the first channel 112a, the second channel 112b, and the third channel 112c, the first laser emitter 132a, the second laser emitter 132b, and the third laser emitter 132c are operating properly so that the monitor photodiodes 142a-c and the detector photodiodes 162a-c receive sufficient light so that the primary channels 122a-c provide data to the laser emitter and data is received through the receiver channels 172a-d to the host receiver channels 182a-c. The secondary channels 126a-c do not provide any data or signal to the fourth primary channel 122d or the fourth laser emitter 132d. Accordingly, the receiver switch 174 does not route a signal or data to the receiver channels 172a-172c. The network is operating in an N+1 configuration with N being three (3), where the first, second, and third laser emitters 132a-c are operating properly. At some point, one of the laser emitters fails and ceases to operate properly, which in this example the first laser emitter 132a fails.

Figure 3B:
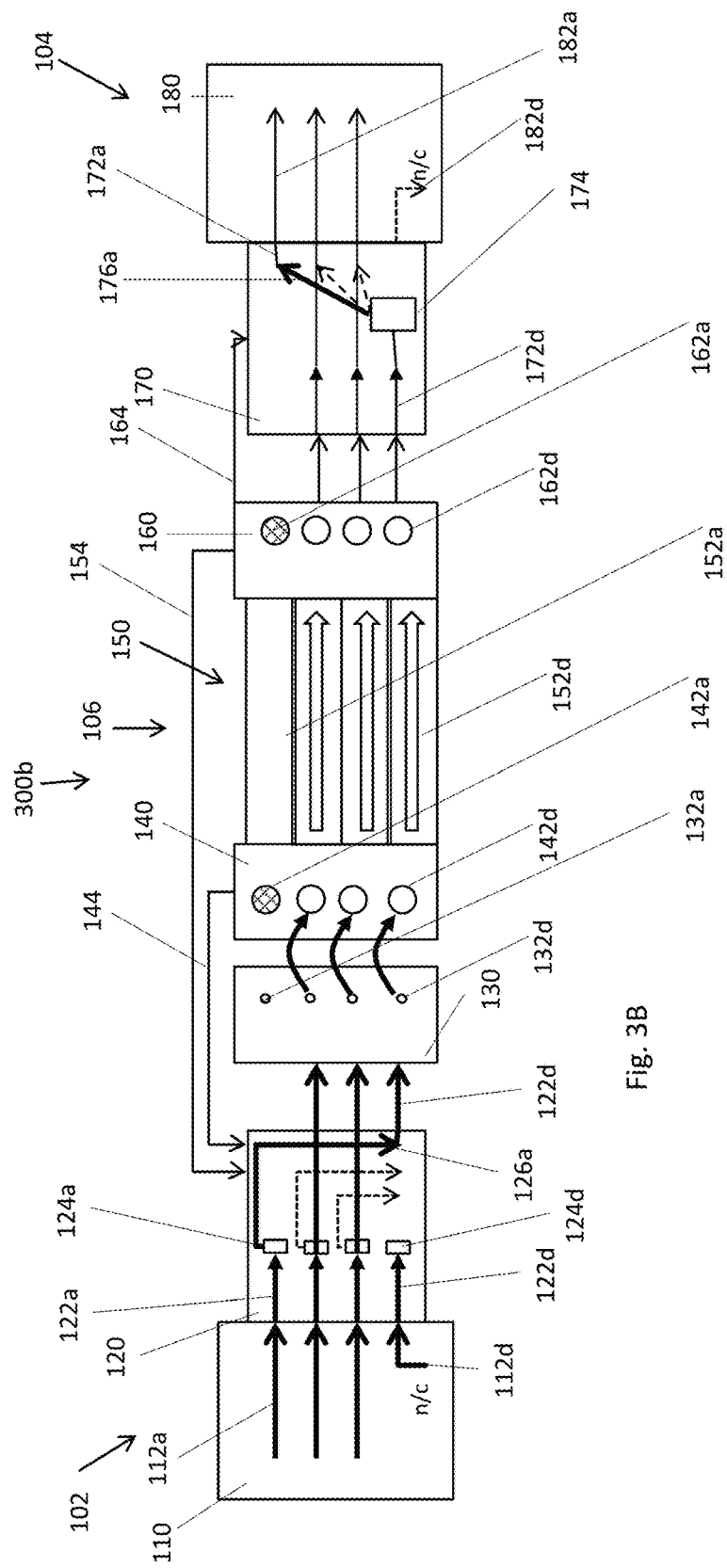
FIG. 3B illustrates an embodiment of a network having a failure.

FIG. 3B illustrates a network 300b where the first laser emitter 132a is dysfunctional or not operating properly, and thereby has failed. The second and third laser emitters 132b-c are working properly, and thereby are not discussed. The fourth laser emitter 132d is either not operating, on standby, or providing only light without data at the time the first laser emitter 132a fails. When the first switch 124a receives the normal electric signal from the monitor feedback loop 144, data continues to flow through the first primary channel 122a and not through the first secondary channel 126a (e.g., shown by dashed line in FIG. 3A). When the first switch 124a no longer receives the normal electric signal from the monitor feedback loop 144, the first switch 124a is flipped and the data is now provided to the first secondary channel 126a, to the fourth primary channel 122d (shown by solid line in FIG. 3B). However, when the first monitor photodiode 142a does not receive proper light from the first laser emitter 132a, a signal or absence of signal can be provided back to the TIC 120 and/or the first switch 124a so that the first switch is tripped, where the indication that the first laser emitter 132a, no longer operating properly, is shown as diagnostic data on the monitor feedback loop 144 changing from dashed to solid (e.g., solid line indicating the first laser emitter 132a is not functioning properly).

When the first laser emitter 132a fails, the first monitor photodiode 142a does not receive proper light, and ceases to provide an electric signal over the monitor feedback loop 144 to the TIC 120 and/or the first switch 124a such that the first switch 124a is tripped to route the signal from the first channel 112a to the first secondary channel 126a, to the fourth primary channel 122d, and to the fourth laser emitter 132d. The fourth primary channel 122d provides the electric signal that is emitted from the fourth laser emitter 132d as an optical signal. Also, the fourth switch 124d may be flipped so that an electrical signal from the fourth channel 112d is blocked from the fourth primary channel 122d. As such, the fourth laser emitter 132d replaces the first laser emitter 132a to provide the data or signal from the first channel 112a to the fourth detector photodiode 162d as an optical signal having the data. The fourth detector photodiode 162d receives the optical signal from the fourth laser emitter 132d via the data link 106, and then converts the optical signal to an electric signal that is provided to the fourth receiver channel 172d. The receiver switch 174 then switches and routes the electrical signal through the first secondary receiver channel 176a to the first receiver channel 172a, which is shown by the first secondary receiver channel 176a changing from a dashed line (FIG. 3A) to a solid line (FIG. 3B). The first receiver channel 172a then provides the electrical signal and data to the first receiver host channel 182a. Accordingly, the failure of the first laser emitter 132a results in the first switch 124a being tripped so that the signal and data are routed through the first secondary channel 126a to the fourth primary channel 122d downstream of the fourth switch 124d and then to the fourth laser emitter 132d, to the fourth detector photodiode 162d, to the fourth receiver channel 172d, to the receiver switch 174 then through the first secondary receiver channel 176a to the first receiver channel 172a, to the first receiver host channel 182a. This process can be configured to be automatic and performed with hardware components without software controlling the switching or routing. Accordingly, the TIC 120 and the RIC 170 can be configured with circuitry that allows for the switching and routing to occur automatically. However, software switching may also be utilized, such as with a controller computer.

Additionally, the detector array 160 can by operably coupled to the RIC 170 through the feedforward channel 164, which can be used to provide signal data regarding which of the detector photodiodes (e.g., 162a-c) is not receiving a signal. Accordingly, the RIC 170 can obtain data that allows the receiver switch 174 to be switched to the receiver channel that has the detector photodiode that is not receiving laser light. The transfer of data through the feedforward channel 164 is shown by changing from dashed (FIG. 3A) to solid (FIG. 3B). In one example, when the detector photodiodes 162a-c receive laser light, they send an electric signal over the feedforward channel 164 to the RIC 170 so that the receiver switch 174 is not switched (e.g., the receiver switch 174 stays on the fourth receiver channel 172d). In another example, when one of the detector photodiodes 162a-c does not receive laser light, the detector array 160 stops sending an electric signal for that detector photodiode (e.g., the first detector photodiode 162a) over the feedforward channel 164 to the RIC 170 so that the receiver switch 174 is switched to the first receiver channel 172a.

The schematics of FIGS. 3A-3B show: the first laser emitter 132a failing, the first monitor photodiode 142a not receiving proper laser light, and the first detector photodiode 162a not receiving proper laser light. Also, to show the data transmission or signal being interrupted by the failure of the first laser emitter 132a, the schematic shows: the monitor feedback loop 144 is activated to indicate a laser has failed by being solid; the first primary channel 122a (or the first channel 112a) provides data to the first switch 124a and then to the first secondary channel 126a, which is shown by the first secondary channel 126a changing from a dashed line (FIG. 3A) to a solid line (FIG. 3B); there is no signal from the first primary channel 122a (or the first channel 112a) to the first laser emitter 132a, which is shown by the absence of the first primary channel 122a between the first switch 124a and first laser emitter 132a; no signal or data is transmitted through the first optical fiber 152a, which is shown by the absence of the arrow (FIG. 3A shows arrow, FIG. 3B has no arrow); and the first detector photodiode 162a doesn't receive a signal so no signal is sent through the first receiver channel 172a from the first detector photodiode 162a, which is shown by the absence of the relevant arrows in FIG. 3B. To show the routing of the data or signal transmission from the fourth detector photodiode 162d, the schematic shows: the fourth detector photodiode 162d receives the optical signal from the fourth laser emitter 132d via the data link 106 by having white backfill; the fourth detector photodiode 162d converts the optical signal to an electric signal that is provided to the fourth receiver channel 172d, which changes from dashed line (FIG. 3A) to solid line (FIG. 3B); the receiver switch 174 then switches and routes the electrical signal through the first secondary receiver channel 176a, which changes from dashed line (FIG. 3A) to solid line (FIG. 3B); the first secondary receiver channel 176a routes the electrical signal to the first receiver channel 172a by the solid arrow being connected therewith so that the downstream portion of the first receiver channel 172a is shown as a solid line.

Additionally, FIG. 3B shows the detector feedback loop 154 being solid. This can represent that data regarding the absence of a signal or light at a detector photodiode (e.g., the first detector photodiode 162a) being sent from the detector array 160 to the TIC 120. The data regarding the absence of a signal or light at a detector photodiode can be used for diagnostics, such as to determine whether the corresponding laser emitter (e.g., the first laser emitter 132a) or optical fiber (e.g., the first optical fiber 152a) or the data link 106 is compromised and not functioning properly. When the corresponding monitor photodetector (e.g., first monitor photodiode 142a) detects sufficient laser light from the corresponding laser emitter (e.g., the first laser emitter 132a), then the TIC 120 can provide an indication that the data link or optical fiber is compromised and not transmitting the optical signal properly. However, when the corresponding monitor photodetector (e.g., first monitor photodiode 142a) does not detect sufficient laser light from the corresponding laser emitter (e.g., the first laser emitter 132a), then the TIC 120 can provide an indication that the laser emitter 132 is compromised and not functioning properly. Also, the transceiver or receiver can include a controller (e.g., a controller 101a or a controller 101b, FIG. 1B) that can make the determinations and/or perform the diagnostics, or otherwise facilitate inspection of the laser emitter or optical fiber link.

With regard to FIGS. 3A and 3B, as long as the second and third laser emitters 132b-c operate properly, the system functions as required. Accordingly, the four channel system is configured as a 3+1 system where there are three main channels and a backup channel. This allows the invention to be employed by N+1 systems with N main channels and a single backup channel, where N can be any integer, such as 1, 2, 3, 4, 5, 6, 7, 8, 9, 10, 11, 12, 13, 14, 15, 16, 17, 18, 19, 20, 21, 22, 23, or higher as needed, desired, or developed. However, N being 3 or higher can be preferred. While only one spare channel is illustrated, there can be M spare channels for the system, where M is an integer as defined herein.

Figure 4:
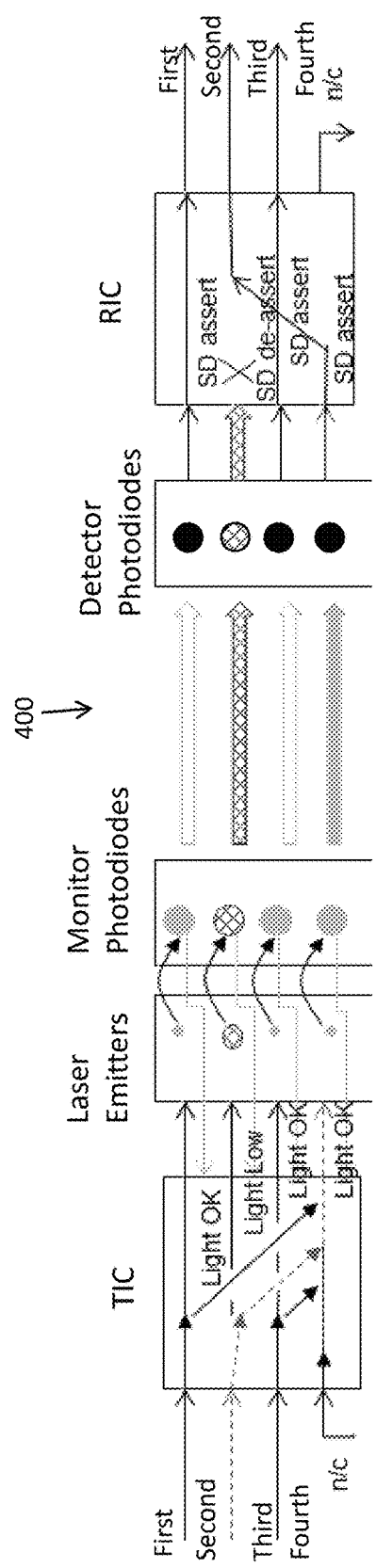
FIG. 4 illustrates an embodiment of a network when one of the laser emitters fails.

FIG. 4 shows a schematic of a network 400 when one of the laser emitters fails. When the second laser emitter fails, the fourth laser emitter receives the signal from the second channel and sends it to the fourth detector photodiode, and the signal is routed back to the second channel on the RIC side.

Figure 5:
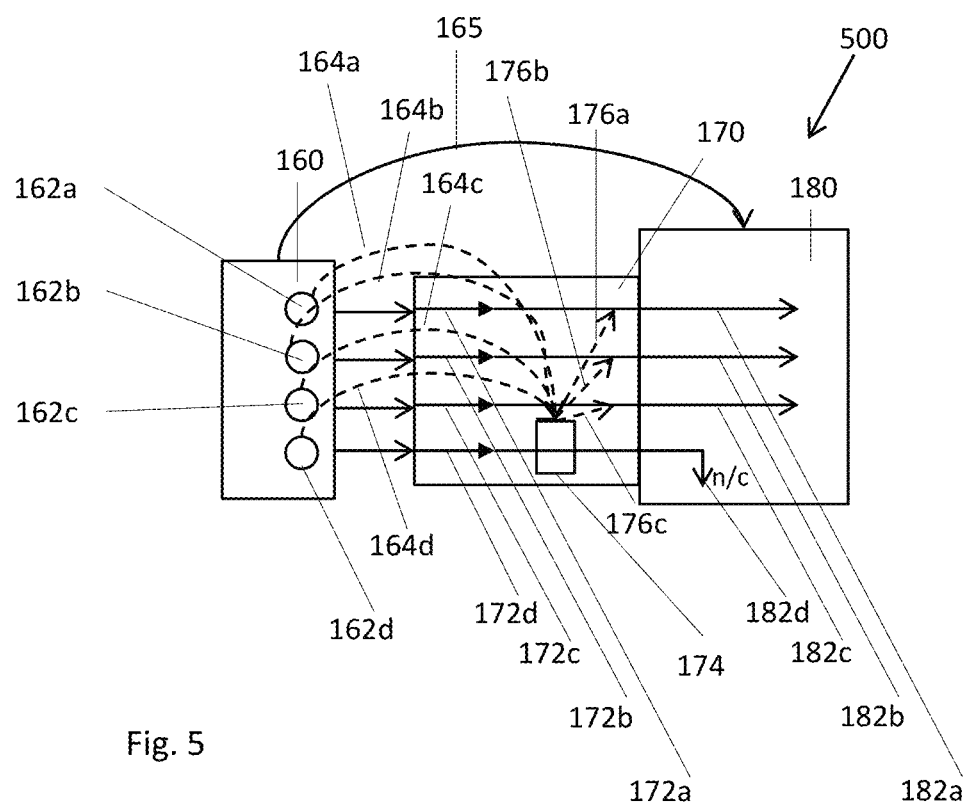
FIG. 5 illustrates an embodiment of a receiver.

FIG. 5 illustrates a receiver 500 where each of the detector photodiodes 162a-d of the detector array 160 is operably coupled with the receiver switch 174 of the RIC 170. The coupling can be electronic and/or optical. As such, data regarding whether each of the detector photodiodes 162a-d can be obtained and provided to the RIC 170, or provided directly to the receiver switch 174 via the feedforward channels 164a-d. As such, the first feedforward channel 164a connects the first detector photodiode 162a to the receiver switch 174, the second feedforward channel 164b connects the second detector photodiode 162b to the receiver switch 174, the third feedforward channel 164c connects the third detector photodiode 162c to the receiver switch 174, and the fourth feedforward channel 164d connects the fourth detector photodiode 162d to the receiver switch 174. When the laser emitters 132a-d and/or the data link 106 are functioning properly, the detector photodiodes 162a-d provide a first signal to the receiver switch 174, which allows the receiver channels 172a-d to keep receiving the appropriate signals. When one of the laser emitters 132a-d and/or the data link 106 are not functioning properly, one of the detector photodiodes 162a-d provides a second signal to the receiver switch 174. The second signal causes the receiver switch 174 to switch to the corresponding secondary receiver channel (e.g., 176a-c) so that the data is routed by the fourth receiver channel 172d though the receiver switch 174 and through the secondary receiver channel (e.g., 176a-c) to the receiver channel of the lane having the detector photodiode that is not receiving light. One of the first or second signal may be an electrical signal and the other can be the absence of an electrical signal, which allows for automatic diagnostics. This allows for the detector photodiode to send an electric signal when it receives proper laser light from the laser emitter, and the electric signal keeps the receiver switch 174 switched to the fourth receiver channel 172d. When a detector photodiode ceases to receive laser light from a laser emitter, that detector photodiode ceases to send an electric signal to the receiver switch 174, and the receiver switch 174 is tripped to route the data through the corresponding receiver secondary channel to the appropriate primary channel of the lane with the detector photodiode that is not receiving light. This redundancy can allow for improved operation.

For example, the first laser emitter 132a is dysfunctional or not operating properly. The second and third laser emitters 132b-c are working properly, and thereby are not discussed. The fourth laser emitter 132d and the fourth detector photodiode 162d are either not operating, on standby, or providing/receiving only light without data. The first detector photodiode 162a does not receive proper light when the first laser emitter 132a (or the data link 106) is not operating properly, and ceases to provide an electric signal over the first feedforward channel 164a to the receiver switch 174. When the receiver switch 174 receives the normal electric signal from the first feedforward channel 164a, data continues to flow through the first receiver channel 172a. When the receiver switch 174 no longer receives the normal electric signal from the first feedforward channel 164a, the receiver switch 174 is flipped and the data is now provided to the first secondary receiver channel 176a, to the first secondary receiver channel 176a, and to the first receiver host channel 182a. As such, the fourth detector photodiode 162d replaces the first detector photodiode 162a and the receiver switch 174 routes the data through the first secondary receiver channel 176a to the first receiver channel 172a. As long as the second and third laser emitters 132b-c operate properly and the second and third detector photodiodes 162b-c receive proper laser light, the system functions as required. Accordingly, the four-channel system is configured as a 3+1 system where there are three main channels and a backup channel. This allows the invention to be employed by N+1 systems with N main channels and a single backup channel, where N can be any integer, such as 1, 2, 3, 4, 5, 6, 7, 8, 9, 10, 11, 12, 13, 14, 15, 16, 17, 18, 19, 20, 21, 22, 23, or higher as needed, desired, or developed. However, N being 3 or higher can be preferred.

Additionally, FIG. 5 shows a feedforward loop 165 that communicatively couples the detector array 160 with the receiver host 180. The feedforward loop 165 can be used with or in place of the feedforward channel 164 or any of the detector feedforward loops 165a-165d. As such, the feedforward loop 165 can provide the data regarding lack of light at a detector photodiode directly to the receiver host 180. Then, the receiver host 180 can implement the sparing protocol described herein, where a controller (e.g., the controller 101b) may control such a protocol. Control of the protocol can involve utilizing software to instruct the switch to switch, or providing an indication of a lane de-assert.

In one embodiment, the TIC and RIC can be configured as complete integrated circuits with the logic to facilitate automatic determinations of laser emitter failure and routing of the signal to the spare lane. This can be a hardware-specific sparing architecture, such as in the integrated circuit. Accordingly, the transmitter can implement the sparing protocol at the hardware level or module level, such as in the IC. On the other hand, the sparing may not be controlled at the system level.

In one embodiment, corresponding laser emitters and monitor photodiodes can be prepared as common in the art. This can be a setup where a small portion of the light is directed to the monitor photodiode and the rest is directed out the data link optical fiber. For example, 95% or more of the light emitted by the laser emitter can be directed out the optical fiber. The small amount of light allows for a monitor signal to be provided to the TIC or transmitter host to provide an indication of whether or not the particular laser emitter is functioning properly. Once failure of the particular laser occurs, the monitor photodiode does not receive the laser light, and the monitor signal provides an indication the laser emitter has failed, which causes the TIC to automatically route the signal of the lane having the failed laser emitter to the spare lane. The monitor signal can be a low light signal, or a signal from the monitor photodiode can be terminated once the laser emitter fails, and the absence of the monitor signal can provide the indication the laser emitter has failed.

In one embodiment, when a detector photodiode does not receive laser light, the lane for that detector photodiode changes from signal detect ("SD") assert to SD de-assert. This causes the RIC to then switch the data on the backup lane to be provided to the lane having the SD de-assert. This can be implemented as a hardware failover configuration in the receiver with the detector array and RIC. Also, the RIC can be configured with hardware output and/or software output to implement the lane switching to route the data to the proper lane that is experiencing the laser failover. Such hardware output and/or software output can be used to provide the receiver host or some other computing system with the information regarding the failover so that the components can be replaced. A higher level system can be flagged so that the defective component can be replaced. The notification can be analyzed with the TIC data regarding the monitor photodiode to determine whether the laser emitter has failed or if the data link has failed. The processing of the data regarding low laser light or no laser light at the TIC and/or monitor photodiode and at the RIC and detector photodiode can be used to determine the component that needs to be checked, repaired, and/or replaced. Also, if the TIC and monitor photodiode provide data that the laser emitter for the lane is operating within proper parameters, the RIC and detector photodiode may provide data that the receiver or detector array includes a detector photodiode that is malfunctioning and needs to be checked, repaired, and/or replaced. For example, if the optical fiber shows light, but the detector photodiode shows that there is no light, then it can be determined that the detector photodiode is malfunctioning, where the laser emitter and data link may be operating properly or in suitable condition.

In one embodiment, the spare channel can be not connected to anything or a "no connect" at the transmitter host and/or receiver host. As such, the spare channel may not be connected or it does not need to be connected to anything at the transmitter or receiver hosts. This includes the spare channel being redundant in the system. Accordingly, the connections at the transmitter host and receiver host determine if the spare channel is redundant, where the TIC and RIC can be any IC with four channels and switches that can change the lane from a primary channel to the backup channel in the TIC and from the backup channel to the primary channel in the RIC.

In one embodiment, in the RIC when a lane is operating with SD assert, the lane is operational and the data signal is routed properly through that lane. However, the lane in the RIC switches to SD de-assert when the detector photodiode of that lane does not receive proper laser light. This causes the RIC to route the data from the spare lane to the lane with the SD de-assert. When the RIC detects an SD de-assert on one lane and an SD assert on the spare lane, the RIC can automatically trip the receiver switch to route the data through the appropriate secondary channel to the appropriate primary channel having the SD de-assert. Also, when the RIC detects an SD de-assert on one lane and a signal on the spare lane, the RIC can automatically trip the receiver switch to route the data through the appropriate secondary channel to the appropriate primary channel having the SD de-assert.

In one embodiment, a host can receive data regarding laser emitter failover or a detector photodiode not receiving laser light. The host can use the data to implement a sparing protocol as described herein, and can cause the switches in the ICs to switch. Also, the data allows the host to provide diagnostics and force the ICs to switch the switches so that the data is routed to the appropriate lanes, secondary channels, and primary channels as described herein. The host can send a software command to implement the sparing protocol. This provides on-demand lane switching to the spare and back to the appropriate receiver lane.

Figure 7:
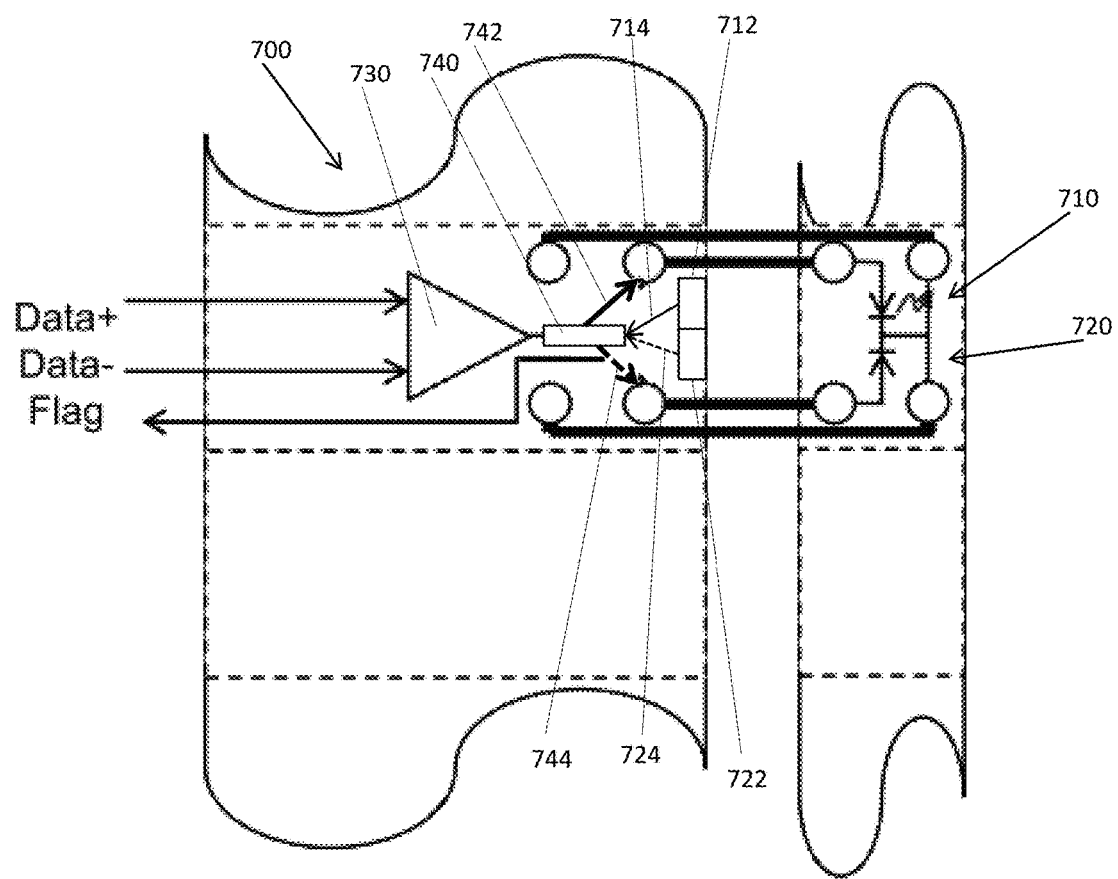
FIG. 7 illustrates an embodiment of a laser having a primary laser emitter and a secondary laser emitter.

FIG. 7 illustrates a laser 700 having a primary laser emitter 710 and a secondary laser emitter 720. As shown, the data is provided to an amplifier 730, which can be a single amplifier, amplifier series, final stage amplifier, combiner amplifier, final multiplier amplifier, or other amplifier that provides a signal to a laser emitter. The amplifier 730 provides the signal to a switch 740; however, the switch may be part of the amplifier 730 or part of an integrated circuit having the amplifier 730. The switch 740 includes a primary output data path 742 and a secondary output data path 744. The primary output data path 742 goes to the primary laser emitter 710 and the secondary output path 744 goes to the secondary laser emitter 720. The secondary output path 744 also has a split that goes to a flag module (flag). The primary laser emitter 710 is optically coupled to a primary monitor photodiode 712, and the secondary laser emitter 720 is optically coupled to a secondary monitor photodiode 722. The primary monitor photodiode 712 is connected to the switch 740 through a primary monitor data path 714 (shown as a solid line), and the secondary monitor photodiode 722 is connected to the switch 740 through a secondary monitor data path 724 (shown as a dashed line). During normal operation of the laser 700, the primary laser emitter 710 emits the laser light, and the primary monitor photodiode 712 receives some of that laser light, and provides a signal through the primary monitor data path 714 to the switch 740, and the switch 740 keeps providing the signal to the primary laser emitter 710. When the primary laser emitter 710 fails and ceases to emit laser light properly, the primary monitor photodiode 712 does not receive light properly and the signal to the switch 740 is changed or terminated. Once the switch 740 receives the changed signal or no signal, it switches the data path to the secondary output path 744 to the secondary laser emitter 720. The secondary laser emitter 720 then emits the laser light and the secondary monitor photodiode 722 provides a signal to the switch 740 and data continues to flow through the secondary output path 744 to the secondary laser emitter 720. Also, when the data signal is switched to the secondary output path 744, the flag also receives a signal which flags the host to indicate the primary laser emitter 710 has failed and the secondary laser emitter 720 is not providing the laser light.

The laser 700 of FIG. 7 can be used in any of the laser emitters of the present invention to provide a double sparing protocol. That is, each laser emitter can have the primary laser emitter and secondary laser emitter, and each monitor photodiode can have a primary monitor photodiode and a secondary photodiode. When the laser 700 is included in the transmitter, transceiver, or networks described herein that use a sparing protocol, the switch from the primary laser emitter to secondary laser emitter can be the primary sparing protocol, and once the secondary laser emitter fails, then the lane changing to the spare laser (e.g., spare primary laser and spare secondary laser) can be the secondary sparing protocol. For example, all of the laser emitters of FIGS. 1A, 1B, 2, 3A, 3B, and 4 can include the primary laser emitter 710 and secondary laser emitter 720 of the laser 700. The laser can be any type of laser, such as a VCSEL.

In one embodiment, the laser module can each be provided to have a primary laser emitter and an adjacent spare laser emitter to enhance system reliability. The separation between the two laser emitter apertures is reduced, and a back side coupling lens can be provided to couple light from either the primary or the spare laser emitter to the same multi-mode fiber. Upon failure of the primary laser emitter, the power drop is detected by an integrated monitor and a switch is activated to direct the laser driver output to the spare laser emitter. In one implementation, the driver IC also initiates a 'flag' signal that tells the system chip or host that a failure has occurred, and that this particular laser is running on a spare laser emitter.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

In one embodiment, the present methods can include aspects performed on a computing system. As such, the computing system can include a memory device that has the computer-executable instructions for performing the method. The computer-executable instructions can be part of a computer program product that includes one or more algorithms for performing any of the methods of any of the claims. As such, the protocols described herein can be implemented by software having computer-executable instructions for performing the protocol. For example, the software can cause the data lane routes and route changes as well as switch flipping. The software can also be used for data analysis to determine if a laser emitter has failed. The software can also be used to change the data route of the receiver in response to a normal lane not having data and data arriving on the spare lane. A memory device can contain the software computing instructions, which can be implemented on a computing system, such as the host.

In one embodiment, any of the operations, processes, methods, or steps described herein can be implemented as computer-readable instructions stored on a non-transitory computer-readable medium. The computer-readable instructions can be executed by a processor of a wide range of computing systems from desktop computing systems, portable computing systems, tablet computing systems, handheld computing systems, as well as network elements and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a non-transitory signal bearing medium (e.g., having software) include, but are not limited to, the following: a recordable type medium such as a floppy disk, a hard disk drive, a CD, a DVD, a digital tape, a computer memory, etc. In one aspect, a non-transitory signal bearing medium does not include a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 6:
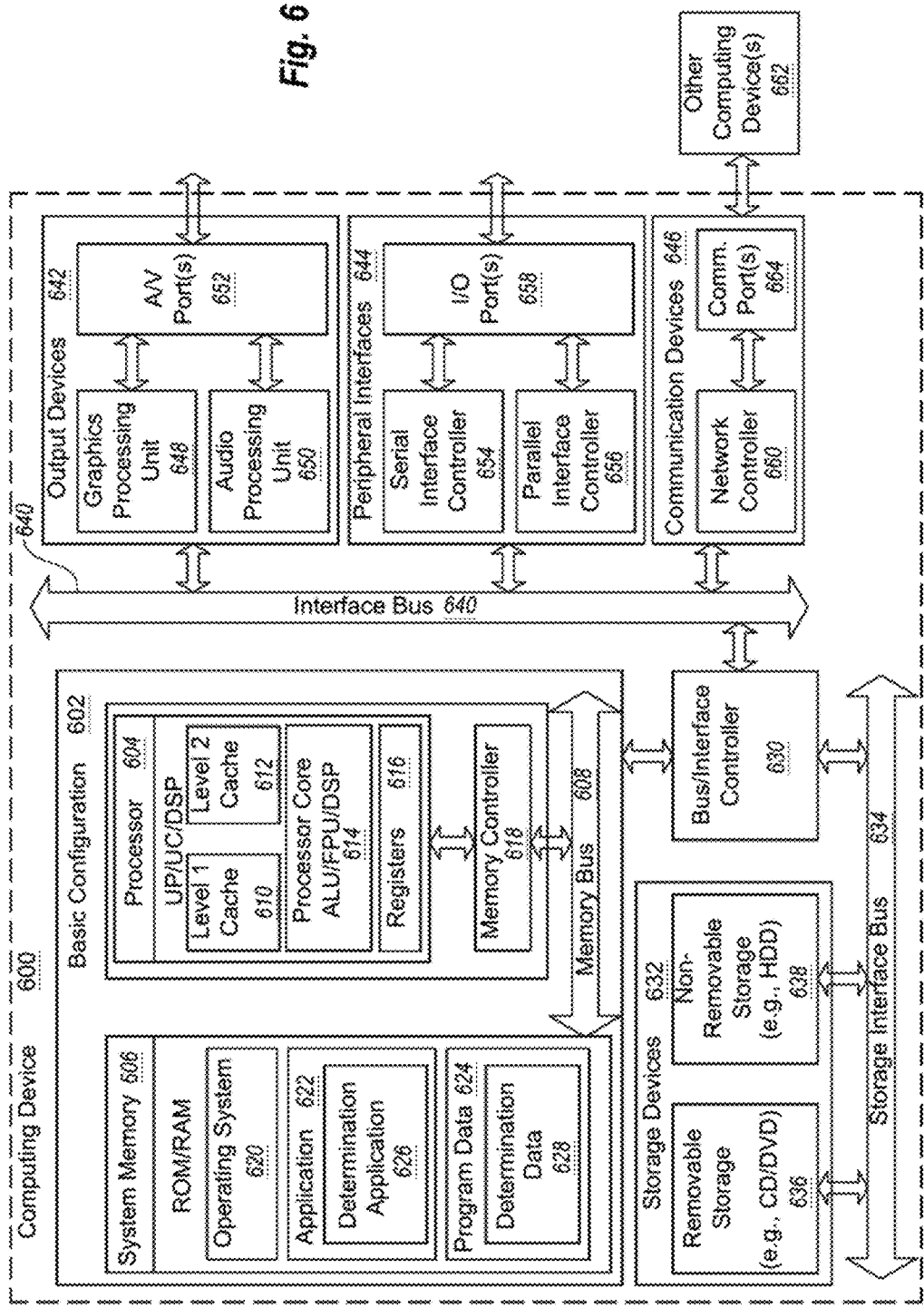
FIG. 6 illustrates an embodiment of a computing device.

FIG. 6 shows an example computing device 600 that is arranged to perform any of the computing methods described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a determination application 626 that is arranged to perform the functions as described herein including those described with respect to methods described herein. Program Data 624 may include determination information 628 that may be useful for analyzing the contamination characteristics provided by the sensor unit 240. In some embodiments, application 622 may be arranged to operate with program data 624 on operating system 620 such that the work performed by untrusted computing nodes can be verified as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety.

The invention claimed is:

1. A method for using a spare communication lane of a data link in optical communications, the method comprising:
   providing a communications system having a transmitter optically coupled via the data link to a receiver, the data link comprising at least one first data lane and a spare data lane,
   the transmitter comprising:
      a laser array having a plurality of primary laser emitters and a spare laser emitter optically coupled with a first end of the data link;
      a monitor array having a plurality of primary monitor photodiodes optically coupled with the plurality of primary laser emitters and a spare monitor photodiode optically coupled with the spare laser emitter; and
      a transmitter integrated circuit operably coupled with the plurality of primary laser emitters and the spare laser emitter, the transmitter integrated circuit comprising:
         a plurality of primary channels operably coupled with the plurality of primary laser emitters;
         a spare channel operably coupled with the spare laser emitter; a plurality of switches having one switch on each primary channel of the plurality of primary channels; and
         a plurality of secondary channels, one secondary channel operably coupled with each switch, each secondary channel being operably coupled with the one spare channel;
   the receiver comprising:
      a photodiode array having a plurality of primary detector photodiodes and a spare detector photodiode operably coupled with a second end of the data link; and
      a receiver integrated circuit operably coupled with the plurality of primary detector photodiodes and the spare detector photodiode, the receiver integrated circuit comprising:
         a plurality of primary receiver channels operably coupled with the plurality of primary detector photodiodes;
         a spare receiver channel operably coupled with the spare detector photodiode;
         a receiver switch on the spare receiver channel; and
         a plurality of secondary receiver channels operably coupled with the receiver switch, and each secondary receiver channel operably coupled with one primary receiver channel;
   determining a communication error such that an electrical first data stream is not being received by a first receiver host channel that is operably coupled to a first primary detector photodiode through a first primary receiver channel, wherein the first primary detector photodiode is optically coupled through a first data lane of the data link to a first primary laser emitter that is operably coupled to a first transmitter host channel through a first primary channel;
   switching a first switch on the first primary channel that is operably coupled with the first primary laser emitter so that the electrical first data stream passes from the first primary channel through the switched first switch through a first secondary channel to the spare channel that is operably coupled with the spare laser emitter;
   transmitting an optical first data stream that corresponds to the electrical first data stream from the spare laser emitter though a spare data lane of the data link to the spare detector photodiode, the spare detector photodiode being operably coupled with the spare receiver channel; and
   switching the receiver switch on the spare receiver channel so that the first electrical data stream passes from the spare receiver channel through the switched receiver switch through a first secondary receiver channel to the first receiver channel and then through the first receiver host channel.

2. The method of claim 1, wherein the communication error is an error in the first primary laser emitter.

3. The method of claim 1, wherein the communication error is an error in the first primary detector photodiode.

4. The method of claim 1, wherein:
   the transmitter includes a transmitter host having the first transmitter host channel; and
   the receiver includes a receiver host having the first receiver host channel.

5. The method of claim 4, wherein the spare channel is coupled to a spare host channel of the transmitter host, the spare host channel having a no connect such that no electronic data stream is passed through the spare host channel.

6. The method of claim 4, wherein the spare channel is coupled to a spare host channel of the transmitter host through a fourth primary channel, the spare host channel receives an electronic fourth data stream from the transmitter host, the method comprising:
   switching a fourth switch on the fourth primary channel so that the fourth data stream does not pass to the spare channel, wherein the switching of the fourth switch is performed after the communication error is determined.

7. The method of claim 4, further comprising providing diagnostic data to the receiver host, the diagnostic data indicating a defective component with instructions to replace the defective component.

8. The method of claim 1, wherein the monitor array is operably coupled with the transmitter integrated circuit through a monitor feedback loop, the method comprising:
   providing functionality data of the first primary laser emitter from a first primary monitor photodiode of the monitor array to the transmitter integrated circuit; and
   the switching of the first switch is controlled by the transmitter integrated circuit in response to the functionality data.

9. The method of claim 1, wherein the monitor array is operably coupled with the transmitter integrated circuit through a monitor feedback loop, the method comprising:
   providing functionality data of the first primary laser emitter from a first primary monitor photodiode of the monitor array to the transmitter integrated circuit;
   the switching of the first switch is controlled by the transmitter integrated circuit; and
   the switching of the fourth switch is controlled by the transmitter integrated circuit.

10. The method of claim 1, further comprising providing functionality data of the spare monitor photodiode to the integrated circuit.

11. The method of claim 1, wherein the photodiode array of the receiver is operably coupled to the transmitter through a detector feedback loop, the method comprising:
   providing functionality data of a quality of laser light received by the photodiode array to the transmitter; and determining:
whether a primary laser emitter is malfunctioning; or the data link is defective.

12. The method of claim 1, wherein the photodiode array of the receiver is operably coupled to the receiver integrated circuit through a feed forward channel, the method comprising:
providing functionality data of a quality of laser light received by the photodiode array to the receiver integrated circuit; and
the switching of the spare switch is controlled by the receiver integrated circuit in response to the functionality data.

13. The method of claim 1, wherein the transmitter includes a first monitor photodiode optically coupled with the first laser emitter, and the first monitor photodiode is operably coupled to the first switch, the method comprising:
determining an error in the first laser emitter by the first monitor photodiode; and
transmitting error data to the first switch so that the first switch is switched to the first secondary channel.

14. The method of claim 1, wherein the switching of the first switch and of the receiver switch is automatic and controlled by hardware components.

15. The method of claim 1, wherein:
the switching of the first switch is controlled by a transmitter computer controller having software that controls the switching of the first switch; and
the switching of the receiver switch is controlled by a receiver computer controller having software that controls the switching of the receiver switch.

16. The method of claim 1, further comprising:
when the first primary detector photodiode does not receive sufficient laser light, a signal detect data is changed to a signal detect de-assert data; and
when the receiver integrated circuit receives the de-assert data, the receiver integrated circuit switches the receiver switch.

17. The method of claim 1, wherein the transmitter has a flag switch, the method comprising:
transmitting a signal from the flag switch when the first primary laser emitter fails and the first spare laser emitter is activated.

18. The method of claim 17, wherein the transmitter includes an amplifier that provides a signal to the flag switch.

* * * * *